(12) United States Patent
Michelitsch

(10) Patent No.: US 10,551,222 B2
(45) Date of Patent: Feb. 4, 2020

(54) CONTROLLER TO REDUCE INTEGRAL NON-LINEARITY ERRORS OF A MAGNETIC ROTARY ENCODER

(71) Applicant: ams AG, Unterpremstaetten (AT)

(72) Inventor: Stephan Michelitsch, Graz (AT)

(73) Assignee: ams AG, Unterpremstaetten (AT)

( * ) Notice: Subject to any disclaimer, the term of this patent is extended or adjusted under 35 U.S.C. 154(b) by 420 days.

(21) Appl. No.: 15/617,948

(22) Filed: Jun. 8, 2017

(65) Prior Publication Data
US 2017/0356766 A1 Dec. 14, 2017

(30) Foreign Application Priority Data
Jun. 9, 2016 (EP) .................................. 16173730

(51) Int. Cl.
*G01D 5/244* (2006.01)
*G01D 5/249* (2006.01)

(52) U.S. Cl.
CPC .......... *G01D 5/2448* (2013.01); *G01D 5/249* (2013.01); *G01D 5/24476* (2013.01)

(58) Field of Classification Search
None
See application file for complete search history.

(56) References Cited

U.S. PATENT DOCUMENTS

| 5,301,019 | A | 4/1994 | Citta | |
| 5,956,659 | A * | 9/1999 | Spies | G01D 5/24476 33/706 |
| 8,898,030 | B2 * | 11/2014 | Ihm et al. | G01B 21/00 702/94 |
| 2001/0043450 | A1 * | 11/2001 | Seale | F01L 9/04 361/160 |

(Continued)

FOREIGN PATENT DOCUMENTS

| CN | 101131329 A | 2/2008 |
| CN | 101680746 A | 3/2010 |

(Continued)

*Primary Examiner* — John E Breene
*Assistant Examiner* — Brandon J Becker
(74) *Attorney, Agent, or Firm* — Fish & Richardson P.C.

(57) ABSTRACT

A controller (1) to reduce integral non-linearity errors of a magnetic rotary encoder (2) comprises a position error determining unit (20) to determine a plurality of time marks (P0, . . . , Pk) specifying a respective time at which a moving device (3) reaches a respective one of predefined positions ($\alpha 0$, . . . , $\alpha k$). The position error determining unit (20) calculates a plurality of error correction parameters (B[0], . . . , B[k]) in dependence on the time marks (P0, . . . , Pk). An error compensation unit (10) of the controller determines a respective error compensated position parameter ($\varphi_{start}$\_comp, $\varphi 0$\_comp, . . . , $\varphi n$\_comp) for each position parameter ($\varphi_{start}$, $\varphi 0$, . . . , $\varphi n$) received from the encoder (2) in dependence on the respective position parameter ($\varphi_{start}$, $\varphi 0$, . . . , $\varphi n$) and the respective error correction parameter (B[0], . . . , B[k]).

15 Claims, 6 Drawing Sheets

(56) References Cited

U.S. PATENT DOCUMENTS

| | | | | |
|---|---|---|---|---|
| 2004/0239282 A1* | 12/2004 | Yoneda | ............... | G05B 13/047 |
| | | | | 318/623 |
| 2006/0290545 A1* | 12/2006 | Granig | ................... | H03M 1/06 |
| | | | | 341/118 |
| 2009/0224717 A1* | 9/2009 | Sawaragi | ................ | G05B 5/01 |
| | | | | 318/610 |
| 2009/0309532 A1* | 12/2009 | Ueda | ...................... | B23K 26/08 |
| | | | | 318/600 |
| 2012/0143549 A1* | 6/2012 | Ihm | ........................ | G01B 21/00 |
| | | | | 702/94 |
| 2014/0028478 A1* | 1/2014 | Mizoguchi | ......... | G01D 5/24476 |
| | | | | 341/11 |
| 2014/0247090 A1 | 9/2014 | Reitsma | | |

FOREIGN PATENT DOCUMENTS

| | | |
|---|---|---|
| CN | 101946158 A | 1/2011 |
| CN | 102297653 A | 12/2011 |
| CN | 102902203 A | 1/2013 |
| CN | 104794534 A | 7/2015 |
| CN | 105345824 A | 2/2016 |
| EP | 1302830 A1 | 4/2003 |
| EP | 2835616 A1 * | 2/2015 |
| EP | 2835616 A1 | 2/2015 |
| EP | 2835616 A1 | 2/2015 |
| EP | 2975364 A1 | 1/2016 |
| GB | 2287322 A | 9/1995 |
| JP | 2006504948 A | 2/2006 |
| TW | 201201545 A | 1/2012 |

* cited by examiner

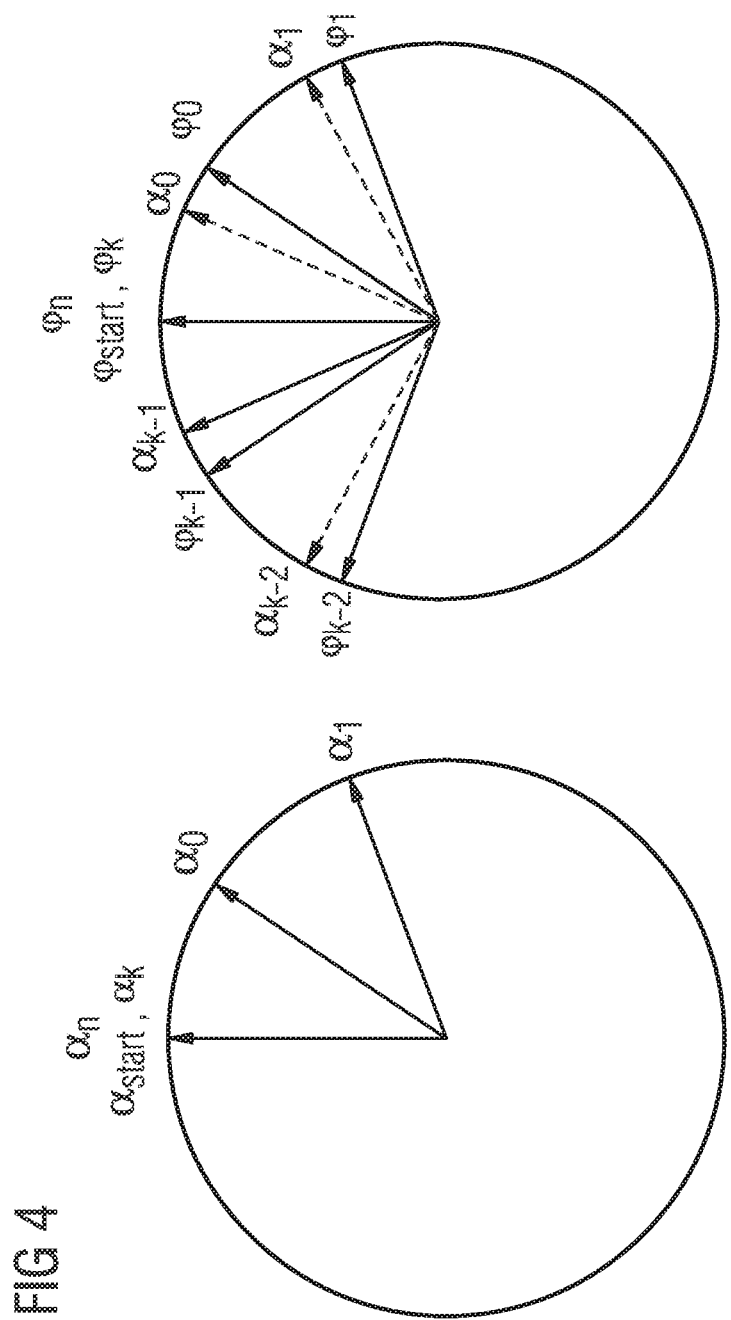

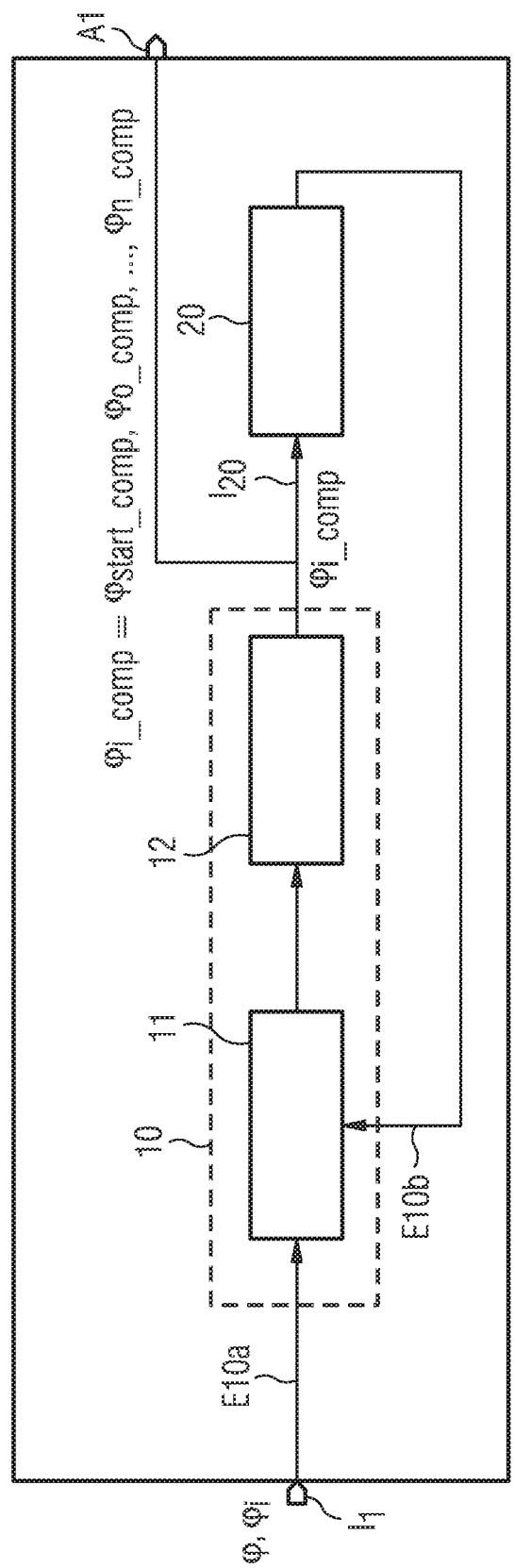

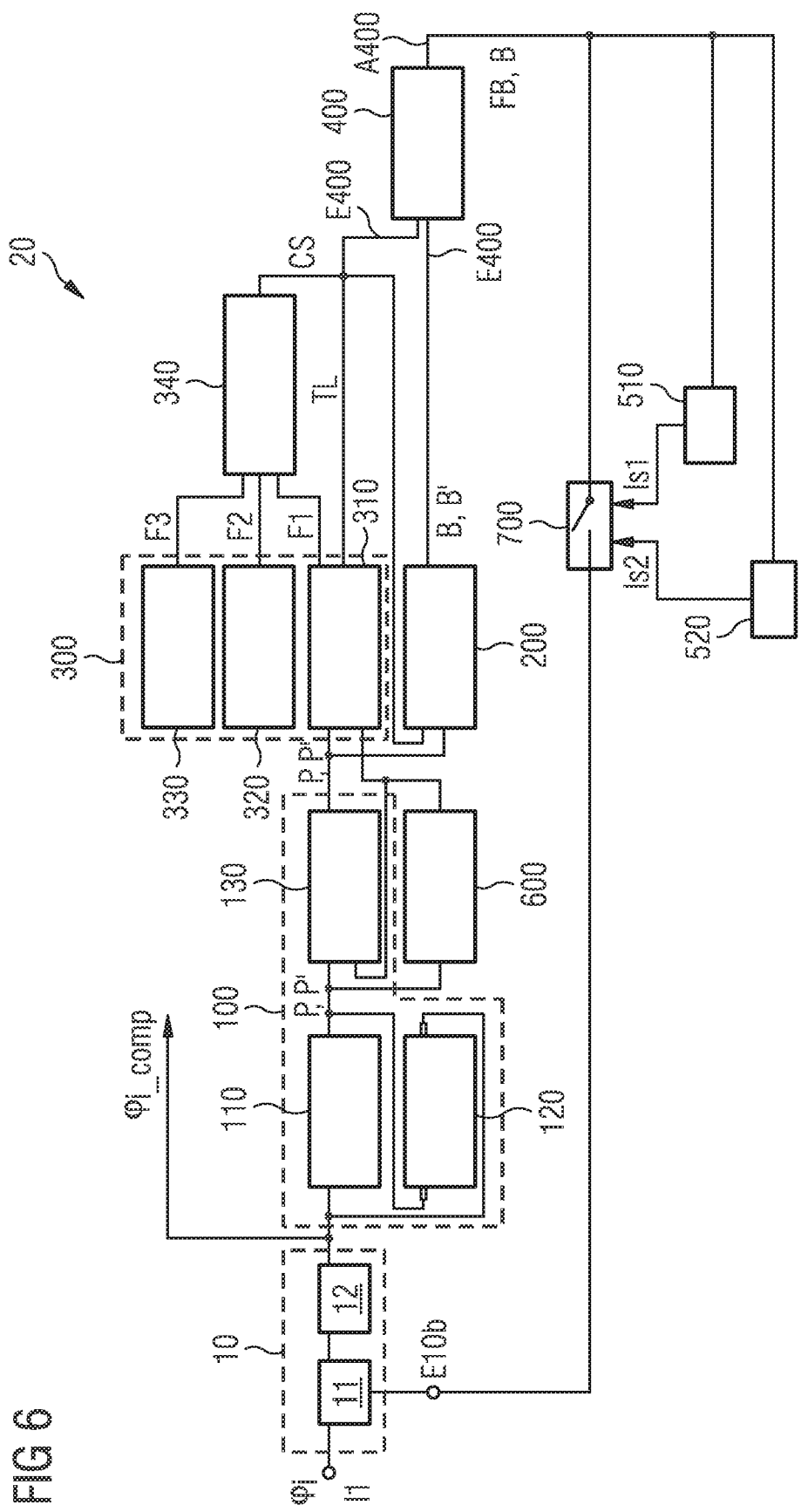

CONTROLLER TO REDUCE INTEGRAL NON-LINEARITY ERRORS OF A MAGNETIC ROTARY ENCODER

The invention is directed to a controller to reduce integral non-linearity errors of a rotary encoder being configured to determine current positions of a moving device, especially a magnetic rotary encoder that is configured to determine current positions of a rotating magnet.

BACKGROUND

A rotary encoder allows to determine a position of a moving device. An exemplified embodiment of a rotary encoder is a magnetic rotary encoder that allows to sense a current rotational position, for example a rotating angle, of a rotating magnet. The magnet is usually arranged above or below a chip of the magnetic rotary encoder. To measure a rotating angle of the magnet, a two-pole magnet rotating over the center of the chip of the magnetic rotary encoder is required. The rotating magnet generates a rotating magnetic field that is sensed by the magnetic rotary encoder, for example by Hall sensors of the encoder. The encoder is configured to determine a current position of the rotating magnet by an appropriate signal processing of the sensed rotating magnetic field of the magnet.

The accuracy of magnetic rotary encoders primarily depends on noise and integral non-linearity (INL). The noise can be reduced by a (low-pass) filter. However, the reduction of the INL is much harder to realize. The noise after the filter is in the range of about 0.1°, but the error caused by the INL is in the range of up to 3° and depends primarily on the magnet position and the magnet. The INL error could be reduced by using a burnt INL-correction circuit. However, the use of a burnt INL-correction circuit requires a calibration for each chip and also cannot react to temperature- and lifetime-drift.

It is a desire to provide a controller to reduce integral non-linearity errors (INL-errors) of a rotary encoder that allows to determine a position of a rotating magnet with high accuracy by reducing the INL induced error.

SUMMARY

A controller to reduce integral non-linearity errors of a rotary encoder so that a position of a moving device, for example a rotating magnet, may be determined with high accuracy is specified in claim 1.

The controller comprises an input terminal to receive a plurality of position parameters specifying a position of a moving device determined by the rotary encoder. The controller further comprises an error compensation unit to determine a plurality of error compensated position parameters respectively assigned to one of the position parameters, wherein a respective one of the error compensated position parameters specifies a respective one of the position parameters being corrected by a respective one of the integral non-linearity position errors.

The controller comprises a position error determining unit having an input side to subsequently receive the plurality of the error compensated position parameters from the error compensation unit. The position error determining unit comprises a time mark determining unit to determine a plurality of first time marks and a plurality of second time marks. Each of the plurality of the first time marks specify a respective time that is needed by the moving device for rotating from a starting position of the first rotation to a respective position of a plurality of predefined positions of the first rotation. Each of the plurality of the second time marks specify a respective time that is needed by the moving device for rotating from a starting position of the second rotation to a respective position of a plurality of predefined positions of the second rotation. An end time mark of the plurality of first time marks specifies the time that is needed by the moving device for a complete first rotation of the moving device from the starting position of the first rotation of the moving device to the starting position of the second rotation of the moving device.

The position error determining unit comprises a position error calculation component to calculate a plurality of error correction parameters. The position error calculation component is configured to determine a respective one of the error correction parameters being assigned to a respective one of the time marks in dependence on the end time mark of the first rotation and the respective one of the first time marks. The error compensation unit comprises a first input connection being coupled to the input terminal and a second input connection being coupled to the position error determining unit.

The error compensation unit is configured to assign a respective one of the error correction parameters to a respective one of the position parameters, when the error compensation unit receives the error correction parameters at the second input terminal of the error compensation unit. The error compensation unit is configured to determine a respective one of the error compensated position parameters for a respective one of the position parameters received at the first input connection in dependence on the respective one of the position parameters and the respective one of the error correction parameters being assigned to the respective one of the position parameters, when the error compensation unit receives the error correction parameters at the second input connection.

The time mark determining unit measures the time, for example clock cycles, between special points of the moving device. In case of using a rotating magnet as a moving device, a magnetic rotary encoder provides a plurality of measured rotating angles including the INL errors to the controller. The time mark determining unit of the controller measures the times between predefined angle points. The time marks may be determined at equidistant angle points, for example all 22.5° or less. The error correction parameters may be calculated by the position error determining unit in dependence on the measured times. The error correction parameters/factors are then used by the error compensation unit to determine the error compensated position parameters.

The error compensation unit may be placed before a filter. The filtered error compensated position parameters may be again analyzed by the position error determining unit and the error correction parameters may be recalculated in a control loop.

According to a possible embodiment, the controller comprises an analyzing unit to monitor the rotation of the magnet to ensure that the rotating speed of the magnet is high enough so that the movement of the rotating magnet is not stopped during a complete rotation and the magnet rotates with a constant speed. To this purpose, the analyzing unit may be configured to compare the time marks of two complete subsequent rotations.

After finding the error correction parameters, the INL reduction provided by the controller works as long as the controller is not switched off. According to an improved embodiment, the calculated error correction parameters can be stored in a storage device to provide an improved INL reduction from the first switching-on of the rotary encoder.

Additional features and advantages are set forth in the detailed description that follows, and in part will be readily apparent to those skilled in the art from the description or recognized by practicing the embodiments as described in the written description and claims hereof, as well as the appended drawings. It is to be understood that both the foregoing general description and the following detailed description are merely exemplary, and are intended to provide an overview or framework to understand the nature and character of the claims.

BRIEF DESCRIPTION OF THE DRAWINGS

The accompanying Figures are included to provide a further understanding, and are incorporated in and constitute a part of this specification. The drawings illustrate one or more embodiments, and together with the detailed description serve to explain principles and operations of the various embodiments. As such, the disclosure will become more fully understood from the following detailed description, taken in conjunction with the accompanying Figures, in which:

FIG. 4 shows a comparison of actual positions and measured positions of a rotating magnet.

FIG. 5 shows a principle architecture of an embodiment of a controller to reduce integral non-linearity errors of a magnetic rotary encoder.

FIG. 6 is a detailed illustration of an embodiment of a controller to reduce integral non-linearity errors of a magnetic rotary encoder.

DETAILED DESCRIPTION

Figure 1:
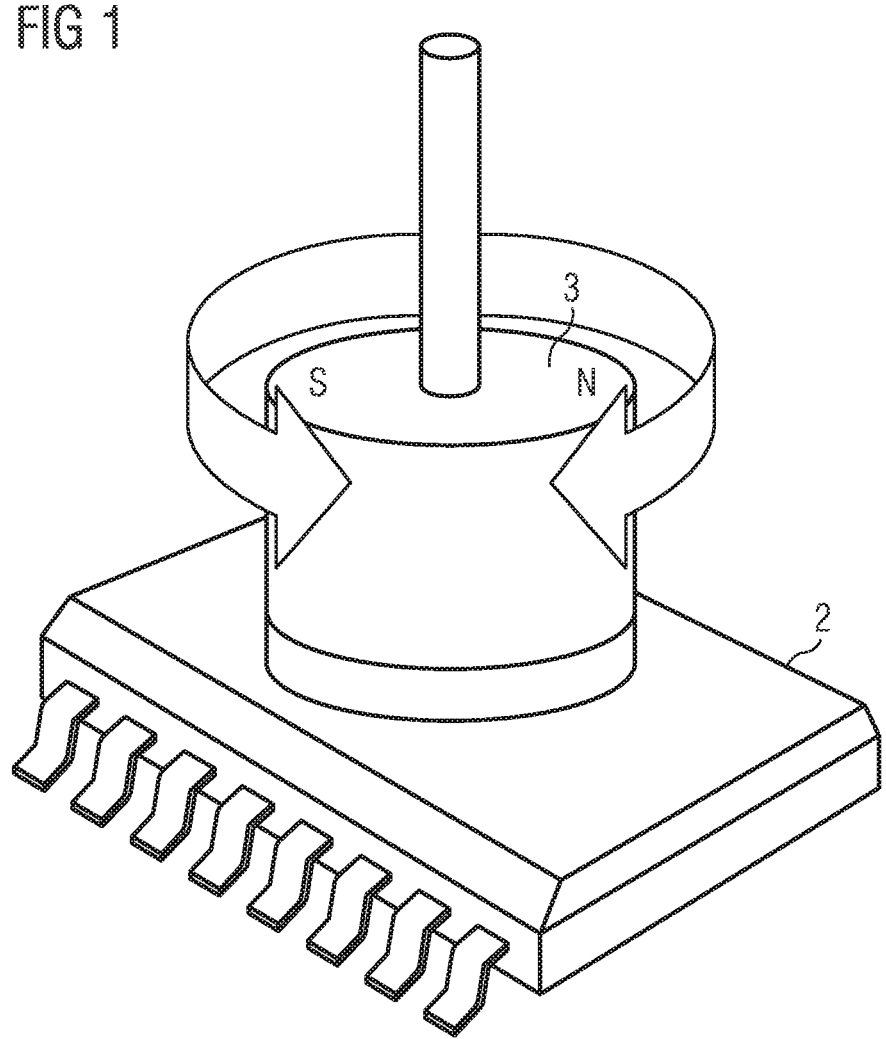
FIG. 1 shows an arrangement of a rotating magnet being installed above a chip of a magnetic rotary encoder.

FIG. 1 shows an arrangement of a moving device 3 and a rotary encoder 2. The rotary encoder is configured as a magnetic rotary encoder. The moving device 3 is configured as a magnet that is rotating above the magnetic rotatory encoder 2. The magnetic rotary encoder is configured to detect the magnetic rotating field generated by the rotating magnet 3 and to determine a current position of the magnet by evaluating the detected magnetic field.

Figure 2:
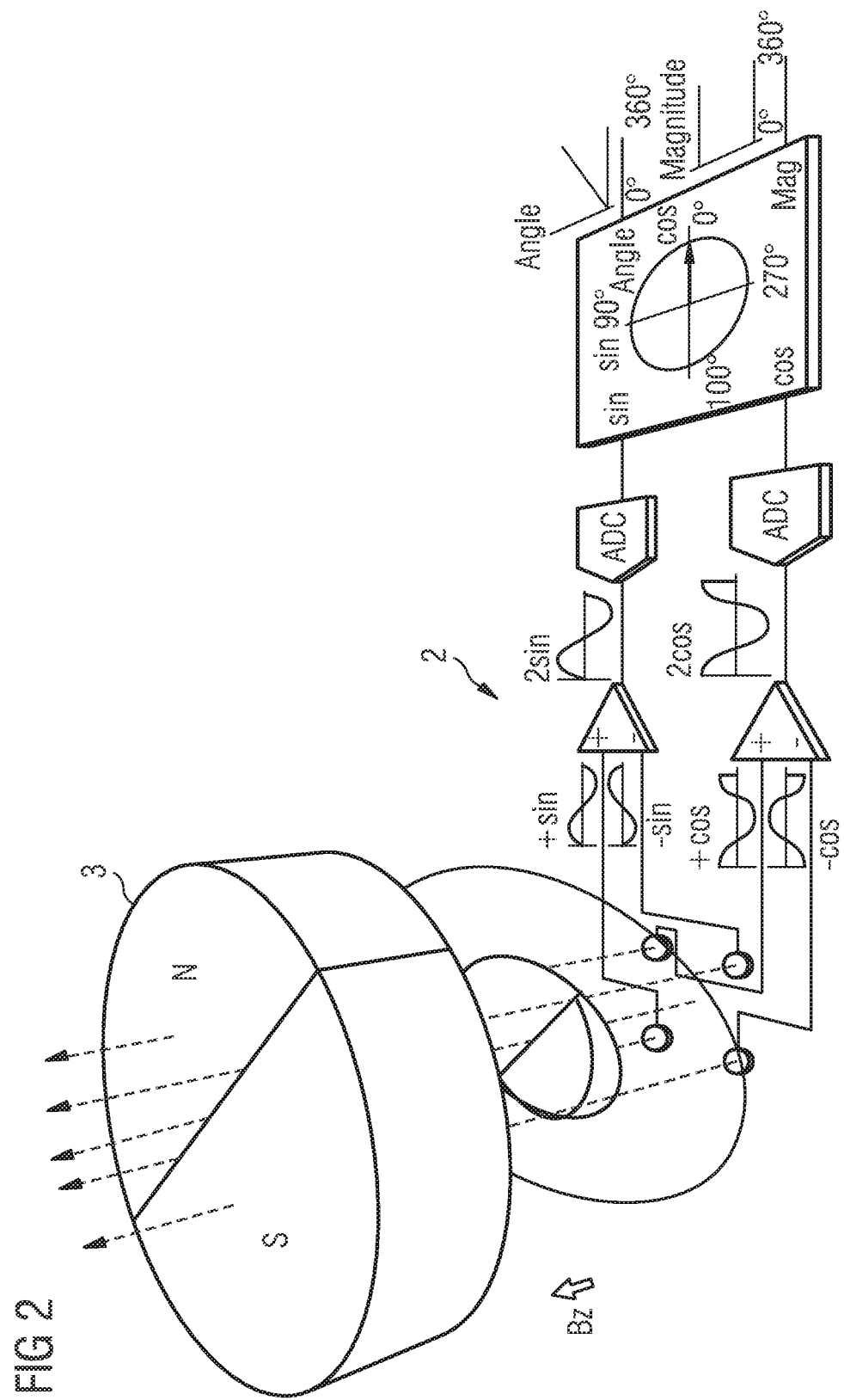
FIG. 2 illustrates the detection of a magnetic field of a rotating magnet to calculate a current position of the rotating magnet.

FIG. 2 illustrates an appropriate signal processing of the magnetic rotary encoder 2 to determine a current position, for example a rotating angle, of the rotating magnet 3. The magnetic rotary encoder 3 may comprise magnetic sensitive elements, such as Hall sensors, to detect the rotating magnetic field. A subsequent signal processing unit evaluates the rotating magnetic field detected by the Hall sensors and provides the current rotating angle of the magnet 3 during the rotational movement of the magnet.

Figure 3:
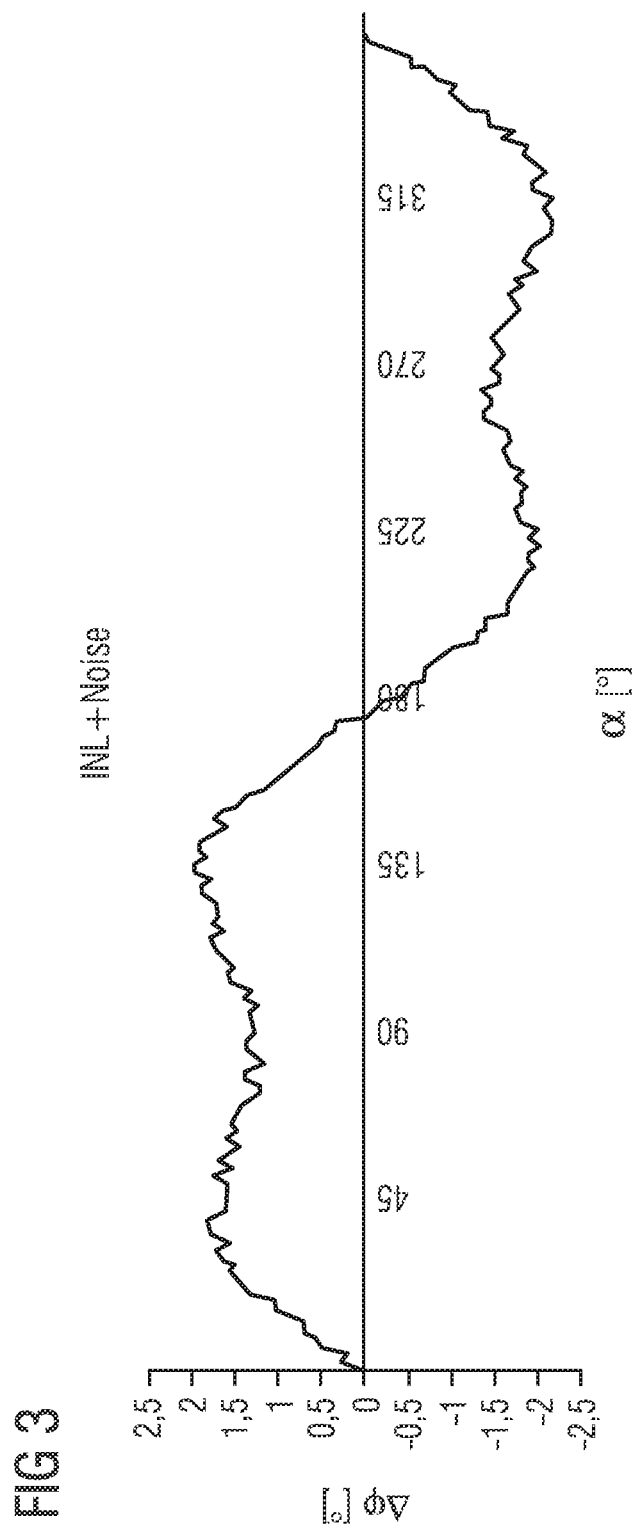
FIG. 3 shows an example of a course of an INL-error with filtered noise.

The accuracy of the magnetic rotary encoder primarily depends on noise and integral non-linearity (INL). FIG. 3 shows the deviation between the actual position of a rotating magnet and the position that is calculated by a magnetic rotary encoder by evaluating the rotating magnetic field. The difference between the actual position of the rotating magnet and the position calculated by the magnetic rotary encoder is shown in FIG. 3 as an angular deviation $\Delta\varphi$. The deviation $\Delta\varphi$ is caused by integral non-linearity (INL) and noise. The error component caused by integral non-linearity is responsible for the large oscillation of the angle error/deviation $\Delta\varphi$ of about +/−2°. The error component caused by the noise is responsible for the small ripples on the course of the angle error $\Delta\varphi$.

The error component caused by the noise can be reduced very well by a (low pass) filter so that the error component caused by the noise is usually in the range of about +/−0.1°, as shown for the ripples in FIG. 3. The main error component is caused by integral non-linearity which may be in a range of up to 3° and depends primarily on magnet position and magnet.

FIG. 3 shows that the error component $\Delta\varphi$ caused by integral non-linearity increases from the actual position of about $\alpha=0°$ of a rotating magnet to the position of about $\alpha=30°$ and fluctuates between $\Delta\varphi=1.3°$ and $\Delta\varphi=2°$ until an actual position $\alpha$ of about 140°, before the angle error decreases and reaches an angle error $\Delta\varphi=0°$ at the actual position $\alpha$ of about 180°. The angle error then again increases, but to the negative range and oscillates between an actual position $\alpha$ of about 220° and an actual position $\alpha$ of about 320° between −1.3° and −2°. The angle error then decreases and reaches 0° at the actual position of the magnet of about $\alpha=360°$.

FIG. 4 shows, on the left side, the actual positions/rotating angles $\alpha_{start}$, $\alpha 0$, $\alpha 1$, . . . , $\alpha n$ of a rotating magnet and on the right side, position parameters $\varphi_{start}$, $\varphi 0$, $\varphi 1$, . . . , $\varphi n$ specifying a measured position of the rotating magnet as determined by the magnetic rotary encoder. According to the course of the angle error $\Delta\varphi$ illustrated in FIG. 3, the magnetic rotary encoder determines the position parameter $\varphi$ with an angle that is larger than the actual rotating angle of the rotating magnet between 0° and 180°, and determines a position parameter $\varphi$ with an angle being smaller than the actual position of the rotating magnet during 180° and 360°.

FIG. 5 shows the principle architecture of a controller 1 to reduce integral non-linearity errors that are included in position parameters calculated by a magnetic rotary encoder. The controller comprises an input terminal I1 that may be connected to the output terminal of a magnetic rotary encoder to receive a plurality of position parameters $\varphi_{start}$, $\varphi 0$, . . . , $\varphi n$. The position parameters $\varphi_{start}$, $\varphi 0$, . . . , $\varphi n$ respectively specify a position $\alpha_{start}$, $\alpha 0$, . . . , $\alpha n$ of a moving device, such as a rotating magnet, wherein the position parameters $\varphi_{start}$, $\varphi 0$, . . . , $\varphi n$ are determined by the magnetic rotary encoder that is connected to the input terminal I1.

The controller 1 comprises an error compensation unit 10 to determine a plurality of error compensated position parameters $\varphi_{start}$_comp, $\varphi 0$_comp, . . . , $\varphi n$_comp. The error compensated position parameters $\varphi N_{start}$_comp, $\varphi 0$_comp, . . . , $\varphi n$_comp are respectively assigned to one of the position parameters $\varphi_{start}$, $\varphi 0$, . . . , $\varphi n$, wherein a respective one of the error compensated position parameters specifies a respective one of the position parameters being corrected by a respective one of the integral non-linearity position errors. The error compensated position parameter $\varphi 0$_comp, for example, specifies the position parameter $\varphi 0$, measured by the encoder, that is corrected by the respective integral non-linearity error.

The controller 1 further comprises a position error determining unit 20 having an input side E20 to subsequently receive the plurality of the error compensated position parameters $\varphi_{start}$_comp, $\varphi 0$_comp, . . . , $\varphi n$_comp from the error compensation unit 10. The position error determining unit 20 is configured to calculate a plurality of error correction parameters B[0], . . . , B[k].

The error compensation unit 10 has a first input connection E10a being coupled to the input terminal I1 and a second input connection E10b being coupled to the position error determining unit 20. The error compensation unit 10 is configured to assign a respective one of the error correction parameters B[0], . . . , B[k] to a respective one of the position parameters $\varphi_{start}$, $\varphi 0$, . . . , $\varphi n$, when the error compensation unit 10 receives the error correction parameters B[0], . . . , B[n] at the second input connection E10b. The error compensation unit 10, for example, assigns the error correction parameter B[0] to the position parameter $\varphi 0$, and the error correction parameter B[k] to the position parameter $\varphi n$ and $\varphi_{start}$.

The error compensation unit 10 is configured to determine a respective one of the error compensated position parameters $\varphi_{start}$_comp, $\varphi 0$_comp, . . . , $\varphi n$_comp for a respective one of the position parameters $\varphi_{start}$, $\varphi 0$, . . . , $\varphi n$ received at the input connection E10a in dependence on the respective one of the position parameters $\varphi_{start}$, $\varphi 0$, . . . , $\varphi n$ and the respective one of the error correction parameters B[0], . . . , B[k] being assigned to the respective one of the position parameters $\varphi_{start}$, $\varphi 0$, . . . , $\varphi n$, when the error compensation unit 10 receives the error correction parameters B[0], . . . , B[k] at the second input connection E10b.

The error compensation unit 10 is, for example, configured to determine the error compensated position parameter $\varphi 0$_comp for the position parameter $\varphi 0$ in dependence on the position parameter $\varphi 0$ and the error correction parameter B[0], and to determine the error correction position parameter $\varphi 1$_comp for the assigned position parameter $\varphi 1$ in dependence on the position parameter $\varphi 1$ and the error correction parameter B[1], etc. The error compensated position parameter $\varphi_{start}$_comp/$\varphi n$ is determined for the position parameter $\varphi_{start}$/$\varphi n$ in dependence on the position parameter $\varphi_{start}$/$\varphi n$ and the error correction parameter B[k].

The error correction position parameters $\varphi_{start}$_comp, $\varphi 0$_comp, . . . , $\varphi n$_comp specify the position parameters $\varphi_{start}$, $\varphi 0$, . . . , $\varphi n$ being calculated by the magnetic rotary encoder that are corrected by the error correction parameters B[0], . . . , B[k]. The error correction parameters B[0], . . . , B[k] represent the integrity non-linearity position errors assigned to each of the position parameters $\varphi_{start}$, $\varphi 0$, . . . , $\varphi n$.

The error compensation unit 10 may comprise an error reduction component 11 and a subsequently arranged filter 12. The error reduction component 11 of the error compensation unit 10 is configured to determine a respective one of the error compensated position parameters $\varphi_{start}$_comp, $\varphi 0$_comp, . . . , $\varphi n$_comp for a respective one of the position parameters $\varphi_{start}$, $\varphi 0$, . . . , $\varphi n$ by subtracting the respective one of the error correction parameters B[0], . . . , B[k] being assigned to the respective one of the position parameters $\varphi_{start}$, $\varphi 0$, . . . , $\varphi n$ from the respective one of the position parameters $\varphi_{start}$, $\varphi 0$, . . . , $\varphi n$, when the error compensation unit 10 receives the error correction parameters B[0], . . . , B[k] at the second input connection E10b of the position error compensation unit 10.

That means that the error reduction component 11 determines, for example, the error compensated position parameter $\varphi 0$_comp for the position parameter $\varphi 0$ by subtracting the error correction parameter B[0] from the position parameter $\varphi 0$, and determines, for example, the error compensated position parameter $\varphi 1$_comp by subtracting the error correction parameter B[1] from the position parameter $\varphi 1$, etc., when the error compensation unit 10 receives the error correction parameters B[0], . . . , B[k] at the second input connection E10b of the position error compensation unit 10. The controller 1 provides the calculated error compensated position parameters $\varphi_{start}$_comp, $\varphi 0$_comp, . . . , $\varphi n$_comp at an output terminal A1 of the controller.

FIG. 6 shows an embodiment of the controller 1 to reduce integral non-linearity position errors of a magnetic rotary encoder, wherein the position error determining unit 20 is illustrated in a more detailed fashion compared to FIG. 5. The position error determining unit 20 is coupled with its input side E20 to the error compensation unit 10 to receive the error compensated position parameters $\varphi_{start}$_comp, $\varphi 0$_comp, . . . , $\varphi n$_comp.

The position error determining unit 20 comprises a time-mark determining unit 100 to determine a plurality of first time marks P0, . . . , Pk and a plurality of second time marks P0', . . . , Pk'. Each of the plurality of the first time marks P0, . . . , Pk specify a respective time that is needed by the moving device 3 for rotating from a starting position $\alpha_{start}$ of a first rotation to a respective position of a plurality of predefined positions $\alpha 0$, . . . , $\alpha k$ of the first rotation. Each of the plurality of the second time marks P0', . . . , Pk' specify a respective time that is needed by the moving device 3 for rotating from a starting position $\alpha_{start}$' of a second rotation, being directly subsequent to the first rotation, to a respective position of a plurality of predefined positions $\alpha 0'$, . . . , $\alpha k'$ of the second rotation. An end time mark Pk of the plurality of first time marks P0, . . . , Pk specifies the time that is needed by the moving device 3 for a complete first rotation of the moving device 3 from the starting position $\alpha_{start}$ of the first rotation of the moving device 3 to the starting position $\alpha_{start}$' of the second rotation of the moving device 3.

Assuming the predefined positions $\alpha_{start}$, $\alpha 0$, . . . , $\alpha k$ of the first rotation are angle points that are received by the moving device 3 every 22.5°, the predefined positions are $\alpha 0$=0°, $\alpha 1$=22.5°, $\alpha 3$=45°, . . . , $\alpha k$=360°. The time mark P0 specifies the time that is needed by the moving device 3 from the starting position $\alpha_{start}$=0° to predefined position $\alpha 0$=22.5°; the time mark P2 specifies the time at which the moving device 3 reaches the predefined position $\alpha 2$=45° measured from the starting position $\alpha_{start}$=0°; etc.

In addition to determining the time marks between the predefined sectors from $\alpha_{start}$ to $\alpha 0$, $\alpha_{start}$ to al, etc. for the first rotation and the second time marks for the sectors between $\alpha_{start}$' to $\alpha 0'$, $\alpha_{start}$' to $\alpha 1'$, etc., the time mark determining unit 100 further generates signals for a new rotation and for a new sector. The first and second time marks P0, . . . Pk and P0', . . . , Pk' are generated by a time measuring component 110 of the time mark determining unit 100. The time mark determining unit 100 further comprises a monoflop 120 which is used to detect a real new rotation of the moving device 3. The time mark determining unit 100 may comprise a storage component 130 to store the first time marks P0, . . . , Pk for the first rotation and the second time marks P0', . . . , Pk' for the second rotation. The second time marks P0', . . . , Pk' may be stored in a shadow register.

The position error determining unit 20 comprises a position error calculation component 200 to calculate the plurality of error correction parameters B[0], . . . , B[k]. The position error calculation component 200 is configured to determine a respective one of the error correction parameters B[0], . . . B[k] being assigned to a respective one of the time marks P0, . . . , Pk in dependence on the end time mark Pk of the first rotation and the respective one of the time marks P0, . . . , Pk. The error correction parameters are calculated by $$B[i] = \frac{360 * Pi}{Pk} - 22.5° * (i+1); i = 0, \ldots, k$$

The formula means that the measured time marks P0, ..., Pk for the first rotation are transformed to a position, for example an angle, that is then subtracted from the set point of the position, for example the set point of the angle. The time marks P0, ..., Pk may be a number of clock cycles that are counted by a counter of the time-measuring component 110 between the starting point $\alpha_{start}$ and the respective predefined position $\alpha 0$, ..., $\alpha k$. The error correction parameters B[0], ..., B[k] specify the integral non-linearity position errors that is the error between the real position of the moving device to the position determined by the rotary encoder. The calculation is possible because of the moment of inertia. The position error calculation component 200 generates the error correction parameters B[0], ..., B[k] considering the turning direction of the moving device.

The error compensation unit 10 is configured to determine a respective one of the error compensated position parameters $\varphi_{start}$_comp, $\varphi 0$_comp, ..., $\varphi n$_comp for a respective one of the position parameters $\varphi_{start}$, $\varphi 0$, ..., $\varphi n$ by subtracting the respective one of the error correction parameters B[0], ..., B[k] being assigned to the respective one of the position parameters $\varphi_{start}$, $\varphi 0$, ..., $\varphi n$ from the respective one of the position parameters $\varphi_{start}$, $\varphi 0$, ..., $\varphi n$, when the error compensation unit 10 receives the error correction parameters B[0], ..., B[k] at the second input connection E10b of the position error compensation unit 10.

The error compensation unit 10 may be configured to calculate a plurality of interpolated ones of the error correction parameters by performing an interpolation between subsequent ones of the error correction parameters B[0], ..., B[k]. This allows to correct each of the position parameters $\varphi_{start}$, ..., $\varphi n$, especially the positions parameters specifying a position between the predefined positions, and to calculate the respective error compensated position parameter for each of the position parameters.

The position error determining unit 20 comprises a state machine 600 which counts the sectors between the predefine positions $\alpha 0$, ..., $\alpha k$. A state-counter of the state machine 600 may count from 0 to k, for example from 0 to 15, for the first rotation and from k+1 to k', for example from 16 to 31, for the second rotation of the moving device 3. If an INL-failure is discovered in one rotation, the state-counter will start from 0 with the next rotation of the moving device 3.

A prerequisite for determining the error compensated position parameters $\varphi_{start}$_comp, $\varphi 0$_comp, ..., $\varphi n$_comp is that the moving device 3, for example the rotating magnet, is rotating with a constant speed for only two complete turns. The position error determining unit 20 comprises an analyzing unit 300 for analyzing whether the plurality of time marks P0, ..., Pk determined by the time mark determining unit 100 is suited to be used by the position error calculation component 200 to calculate the error correction parameters B[0], ..., B[k].

In order to evaluate if the moving device 3 is rotating with a constant speed for two complete turns the analyzing unit 300 compares the respective times needed by the moving device 3 for two full rotations. According to a possible embodiment of the controller 1, the position error determining unit 20 comprises an evaluation component 310 being configured to evaluate whether the time duration for the second rotation of the moving device 3 differs from the time duration for the first rotation of the moving device 3 by a predefined threshold.

According to an embodiment of the controller 1, the evaluation component 310 is configured to compare the first time marks P0, ..., Pk that are determined by the time measuring component 100 for the first rotation of the moving device with the second time marks P0', ..., Pk' determined by the time measuring component 100 for the second rotation of the moving device. The evaluation component 310 may be configured to assess the applicability of the first time marks P0, ..., Pk for the determination of the error correction parameters B[0], ..., B[k] by assigning a trust level TL to the first time marks P0, ..., Pk.

According to a possible embodiment of the controller, the evaluation component 310 compares the time needed for the first rotation to the time needed for the second rotation of the moving device. If these times are the same or differ from each other within predefined limits, the trust level is low. The more the two rotations differ from each other, the higher the trust level. Therefore, a high trust level TL means that the time marks P0, ..., Pk of this rotation are not very well suited for determining the error correction parameters B[0], ..., B[k]. On the other hand, a low trust level means that the time marks P0, ..., Pk are well-suited for determining the error correction parameters B[0], ..., B[k].

According to a possible embodiment of the controller 1, the position error determining unit 20 further comprises a speed control component 320 being configured to check if the speed of the first rotation of the moving device 3 is above a predefined speed threshold. According to another embodiment, the position error determining unit 20 comprises an acceleration control component 330 to check if the moving device 3 performs an accelerated rotation. In case an accelerated rotation of the moving device is detected, the acceleration control component 330 checks if the acceleration is under a predefined acceleration threshold.

The speed control component 320 and the acceleration control component 330 check if the rotation speed of the moving device 3 is over a chosen limit and if the acceleration is under a chosen limit. If one of the limits is reached, the calculation of the error correction parameters B[0], ..., B[k] is held until the next rotation of the moving device. The minimum speed limit is to activate the calculation of the error correction parameters only at a speed on which the moment of inertia is large enough to be safe that the moving device 3 is in a smooth rotation and will not start and stop during one rotation. The acceleration and speed limit has to be provided from a filter.

According to a possible embodiment of the controller, the evaluation component 310 generates a first flag F1 that indicates whether the speed of the moving device 3 during the first rotation and the speed of the moving device 3 during the second rotation differ at most by a predefined amount. The speed control component 320 may generate a second flag F2 that indicates whether the speed of the moving device 3 during the first and the second rotation is respectively above the predefined speed threshold. The acceleration control component 330 may generate a third flag F3 that indicates whether the acceleration of the moving device 3 is under the predefined acceleration threshold.

According to a possible embodiment of the controller, the position error determining unit 20 may comprise a deciding component 340 to decide whether the first time marks P0, ..., Pk of the first rotation of the moving device 3 are applicable by the position error calculation component 200 to calculate the error correction parameters B[0], ..., B[k]

by evaluating the first, the second and the third flag F1, F2 and F3. The deciding component 340 combines the flag F1 from the evaluation component, the flag F2 from the speed control component and the flag F3 from the acceleration control component and generates a clearing signal CS indicating whether the first time marks P0, . . . , Pk determined by the time mark determining unit 100 may be used by the position error calculation component 200 to calculate the error correction parameters B[0], . . . , B[k].

According to a possible embodiment of the controller 1, the controller comprises an error correction parameter filtering component 400 to generate filtered error correction parameters FB[0], . . . , FB[k]. The error correction parameter filtering component 400 has an input side E400 connected to the position error calculation component 200 for receiving the error correction parameters B[0], . . . , B[k] and an output side A400 connected to the second input connection E10b of the error compensation unit 10. The error correction parameter filtering component 400 is configured to calculate a respective one of the filtered error correction parameters FB[0], . . . , FB[k] assigned to a respective one of the error correction parameters B[0], . . . , B[k].

The error correction parameter filtering component 400 may be configured to calculate the respective filtered error correction parameters by averaging over the respective one of the error correction parameters B[0], . . . , B[k] being assigned to a respective one of the time marks of the last rotation of the moving device 3 and the respective ones of the error correction parameters B'[0], . . . , B'[k] being assigned to a respective one of the time marks of the previous rotations of the moving device 3.

According to a possible embodiment of the controller, the error correction parameter filtering component 400 may be configured to provide the filtering by calculating a weighted average over the respective one of the error correction parameters B[0], . . . , B[k] being assigned to a respective one of the time marks of the last rotation of the moving device 3 and the respective ones of the error correction parameters B'[0], . . . , B'[k] being assigned to a respective one of the time marks of the previous rotations of the moving device 3, wherein the weight of the averaging is set by the trust level TL.

The error correction parameter filtering component 400 generates a respective filtered/averaged error correction parameter FB[0], . . . , FB[k] for each of the error correction parameter B[0], . . . , B[k]. The averaging considers the at last calculated error correction parameters B[0], . . . , B[k] and the previously calculated error correction parameters B'[0], . . . , B'[k]. The error correction parameter filtering component 400 is, for example, configured to calculate the filtered error correction parameter FB[0] by averaging over the last received error correction parameter B[0] calculated by the position error calculation component 200 for the last turn of the moving device 3 and the previously received error correction parameters B'[0] calculated for the previous rotations.

The weighting of the last received error correction parameters in the averaging operation depends on the trust level. If the trustlevel for the error correction parameters B[0], . . . , B[k] is below a predefined threshold, the at last calculated error correction parameters, i.e. the error correction parameters calculated by the position error calculation component 200 for the last turn of the moving device 3, are wasted and are not used for the averaging operation. The averaging improves the accuracy. Noise and speed variation is smaller with this averaging.

The error correction parameter filtering component 400 may be configured as an activatable component that generates and transfers the filtered error correction parameters FB[0], . . . , FB[k] to the second input connection E10b of the error compensation unit 10 in the activated state and that transfers the error correction parameters B[0], . . . , B[k] to the second input terminal E10b of the error compensation unit 10 in the deactivated state. When the error correction parameters B[0], . . . , B[k] are calculated by the position error calculation component 200 for the first time, the averaging may be deactivated to get a working INL improvement as fast as possible. Later the averaging improves it more to get the best results.

The error compensation unit 10 may be configured to determine a respective one of the error compensated position parameters $\varphi_{start}$_comp, $\varphi 0$_comp, . . . , $\varphi n$_comp for a respective one of the position parameter $\varphi_{start}$, $\varphi 0$, . . . , $\varphi n$ by subtracting the respective one of the filtered error correction parameters FB[0], . . . , FB[k] being assigned to the respective one of the position parameter $\varphi_{start}$, $\varphi 0$, . . . , $\varphi n$ from the respective one of the position parameters $\varphi_{start}$, $\varphi 0$, . . . , $\varphi n$, when the error compensation unit 10 receives the filtered error correction parameters FB[0], . . . , FB[k] at the second input connection E10b of the position error compensation unit 10.

When the error compensation unit 10 receives the filtered error correction parameters FB[0], . . . , FB[k] at the second input connection E10b, the error compensation unit 10 subtracts, for example, the filtered error correction parameter FB[0] being assigned to the position parameter $\varphi 0$ from the position parameter $\varphi 0$. The position parameter $\varphi 1$_comp is calculated by the error compensation unit 10 by subtracting the filtered error correction parameter FB[1] from the position parameter $\varphi 1$, etc.

When the error compensation unit 10 receives the filtered error correction parameters FB[0], . . . , FB[k] at the second input connection E10b, the error compensation unit 10 uses the averaged INL-parameters/filtered error correction parameters to subtract the filtered error correction parameters from the non-filtered magnet angle. This allows to reduce the INL-error and the filter 12 can work better and generates a less noisy signal $\varphi_{start}$_comp, $\varphi 0$_comp, . . . , $\varphi n$_comp.

The error compensation unit 10 may be configured to calculate a plurality of interpolated ones of the filtered error correction parameters by performing an interpolation between subsequent ones of the filtered error correction parameters FB[0], . . . , FB[k]. This allows to correct each of the position parameters $\varphi_{start}$, . . . , $\varphi n$, especially the positions parameters specifying a position between the predefined positions, and to calculate the respective error compensated position parameter.

According to a possible embodiment of the controller, the position error determining unit 20 may comprise a first interruption component 510 to generate a first interruption signal IS1 to interrupt the provision of the error correction parameters B[0], . . . , B[k] or the filtered error correction parameters FB[0], . . . , FB[k] to the second input connection E10b of the error compensation unit 10. The first interruption component 510 is configured to evaluate the error correction parameters B[0], . . . , B[k] or the filtered error correction parameters FB[0], . . . , FB[k] and generates the first interruption signal IS1 in dependence on the course of the error correction parameters B[0], . . . , B[k] or the filtered error correction parameters FB[0], . . . , FB[k] during the first rotation of the moving device 3. That means that the first interruption component 510 finds out, if the calculated error correction parameters/filtered error correction parameters show a reasonable INL-curve, such as is shown in FIG. 3, or if a calculation error occurred when calculating the error correction parameters/filtered error correction parameters.

According to a further embodiment of the controller, the position error determining unit 20 comprises a second interruption component 520 to generate a second interruption signal IS2 to interrupt the provision of at least one of the error correction parameters B[0], . . . , B[k] and the filtered error correction parameters FB[0], . . . , FB[k] to the second input connection E10b of the error compensation unit 10. The second interruption component 520 is configured to evaluate the at least one of the error correction parameters B[0], . . . , B[k] and the filtered error correction parameters FB[0], . . . , FB[k] and generates the second interruption signal IS2 in dependence on the value of the at least one of the error correction parameters and the filtered error correction parameters during the first rotation of the moving device 3.

If the error correction parameters B[0], . . . , B[k]/the filtered error correction parameters FB[0], . . . , FB[k], i.e. the INL-parameters, are very low, for example lower than about 0.2°, the INL-compensation has no effect and might increase the noise. The second interruption component 520 finds out if the INL-compensation makes sense and switches it on or off. The INL-compensation may be switched on and off by the second interruption component 520 within one rotation to optimize the result.

In order to interrupt the provision of the error correction parameters/the filtered error correction parameters a controllable switch 700 is provided between the error compensation unit 10 and the position error determining unit 20. The controllable switch 700 may be switched in an open state to interrupt the INL-compensation or in a closed state to enable the INL-compensation by means of the first interruption signal IS1 and/or the second interruption signal IS2.

The controller 1 allows to reduce integral non-linearly position errors of a rotary encoder by calculating error correction parameters/filtered error correction parameters that are used by the error compensation unit 10 to determine error compensated position parameters. The controller only provides or only calculates the error correction parameters/filtered error correction parameters to the error compensation unit 10, if the moving device rotates with a constant speed during the last two rotations to calculate the INL error correction parameters/the INL error compensated position parameters. If the first time marks determined by the time mark determining unit are not well-suited for determining the error correction parameters B[0], . . . , B[k], for example due to high noise or no constant speed, the provided first time marks P0, . . . , Pk will be wasted and have no effect on the INL-compensation. In this case the time marks P0, . . . , Pk calculated during the rotation of the moving device are not used for the calculation of the error correction parameters.

LIST OF REFERENCE SIGNS 1 controller
2 magnetic rotary encoder
3 moving device
10 error compensation unit
11 error reduction component
12 filter
20 position error determining unit
100 time mark determining unit
110 time measuring component
120 monoflop
130 storage component
200 position error calculation component
300 analyzing unit
310 evaluation component
320 speed control component
330 acceleration control component
340 deciding component
400 error correction parameter filtering component
510 first interruption component
520 second interruption component
600 state machine
700 controllable switch

The invention claimed is:

1. A controller to reduce integral non-linearity position errors of a rotary encoder, comprising:
an input terminal to receive a plurality of position parameters specifying a position of a moving device determined by the rotary encoder,
an error compensation unit to determine a plurality of error compensated position parameters respectively assigned to one of the position parameters, wherein a respective one of the error compensated position parameters specifies a respective one of the position parameters being corrected by a respective one of the integral non-linearity position errors,
a position error determining unit having an input side to subsequently receive the plurality of the error compensated position parameters from the error compensation unit,
wherein the position error determining unit comprises a time mark determining unit to determine a plurality of first time marks and a plurality of second time marks, wherein each of the plurality of the first time marks specify a respective time that is needed by the moving device for rotating from a starting position of a first rotation to a respective position of a plurality of predefined positions of the first rotation, wherein each of the plurality of the second time marks specify a respective time that is needed by the moving device for rotating from a starting position of a second rotation to a respective position of a plurality of predefined positions of the second rotation, wherein an end time mark of the plurality of first time marks specifies the time that is needed by the moving device for a complete first rotation of the moving device from the starting position of the first rotation of the moving device to the starting position of the second rotation of the moving device,
wherein the position error determining unit comprises a position error calculation component to calculate a plurality of error correction parameters, wherein the position error calculation component is configured to determine a respective one of the error correction parameters being assigned to a respective one of the time marks in dependence on the end time mark of the first rotation and the respective one of the first time marks,
wherein the error compensation unit comprises a first input connection being coupled to the input terminal and a second input connection being coupled to the position error determining unit,
wherein the error compensation unit is configured to assign a respective one of the error correction parameters to a respective one of the position parameters, when the error compensation unit receives the error correction parameters at the second input terminal of the error compensation unit, wherein the error compensation unit is configured to determine a respective one of the error compensated position parameters for a respective one of the position parameters received at the first input connection in dependence on the respective one of the position parameters and the respective one of the error correction parameters being assigned to the respective one of the position parameters, when the error compensation unit receives the error correction parameters at the second input connection.

2. The controller of claim 1, wherein the position error determining unit comprises an analyzing unit for analyzing whether the plurality of the first time marks determined by the time mark determining unit is suited to be used for the position error calculation component to calculate the error correction parameters.

3. The controller of claim 1, wherein the position error determining unit comprises an evaluation component being configured to evaluate whether the time duration for the second rotation of the moving device differs from the time duration for the first rotation of the moving device by a predefined threshold.

4. The controller of claim 3, wherein the evaluation component is configured to compare the first time marks with the second time marks.

5. The controller of claim 3, wherein the evaluation component is configured to assess the applicability of the first time marks for the determining of the error correction parameters by assigning a trustlevel to the first time marks.

6. The controller of claim 1, wherein the position error determining unit comprises a speed control component being configured to check if the speed of the first rotation of the moving device is above a predefined speed threshold.

7. The controller of claim 1, wherein the position error determining unit comprises an acceleration control component to check if the moving device performs an accelerated rotation and, in case of detecting an accelerated rotation, checks if the acceleration is under a predefined acceleration threshold.

8. The controller of claim 3,
wherein the evaluation component generates a first flag that indicates whether the speed of the moving device during the first rotation and the speed of the moving device during the second rotation differ at most by a predefined amount,
wherein the speed control component generates a second flag that indicates whether the speed of the moving device during the first and the second rotation is respectively above the predefined speed threshold,
wherein the acceleration control component generates a third flag that indicates whether the acceleration of the moving device is under the predefined acceleration threshold,
wherein the position error determining unit comprises a deciding component to decide whether the first time marks of the moving device are applicable by the position error calculation component to calculate the error correction parameters by evaluating the first and the second and the third flag.

9. The controller of claim 1, wherein the error compensation unit is configured to determine a respective one of the error compensated position parameters for a respective one of the position parameters by subtracting the respective one of the error correction parameters being assigned to the respective one of the position parameters from the respective one of the position parameters, when the error compensation unit receives the error correction parameters at the second input connection of the position error compensation unit.

10. The controller of claim 1,
wherein the position error determining unit comprises an error correction parameter filtering component to generate filtered error correction parameters, wherein the error correction parameter filtering component has an input side connected to the position error calculation component for receiving the error correction parameters and an output side connected to the second input connection of the error compensation unit,
wherein the error correction parameter filtering component is configured to calculate a respective one of the filtered error correction parameters assigned to a respective one of the error correction parameters, wherein the respective filtered error correction parameter is calculated by averaging over the respective one of the error correction parameters being assigned to a respective one of the time marks of the last rotation of the moving device and a respective ones of the error correction parameters being assigned to a respective one of the time marks of the previous rotations of the moving device.

11. The controller of claim 10, wherein the error correction parameter filtering component is configured to calculate a weighted average over the respective one of the error correction parameters being assigned to a respective one of the time marks of the last rotation of the moving device and the respective ones of the error correction parameters being assigned to a respective one of the time marks of the previous rotations of the moving device, wherein the weight of the averaging is set by the trust level.

12. The controller of claim 10, wherein the error correction parameter filtering component is configured as an activatable component that generates and transfers the filtered error correction parameters to the second input connection of the error compensation unit in the activated state and that transfers the error correction parameters to the second input terminal of the error compensation unit in the deactivated state.

13. The controller of claim 12, wherein the error compensation unit is configured to determine the respective one of the error compensated position parameters for a respective one of the position parameters by subtracting the respective one of the filtered error correction parameters being assigned to the respective one of the position parameters from the respective one of the position parameters, when the error compensation unit receives the filtered error correction parameters at the second input connection of the position error compensation unit.

14. The controller of claim 1,
wherein the position error determining unit comprises a first interruption component to generate a first interruption signal to interrupt the providing of the error correction parameters or the filtered error correction parameters to the second input connection of the error compensation unit,
wherein the first interruption component is configured to evaluate the error correction parameters or the filtered error correction parameters and generates the first interruption signal in dependence on the course of the error correction parameters or the filtered error correction parameters during the first rotation of the moving device.

15. The controller of claim 1,
wherein the position error determining unit comprises a second interruption component to generate a second interruption signal to interrupt the providing of at least one of the error correction parameters and the filtered error correction parameters to the second input connection of the error compensation unit, wherein the second interruption component is configured to evaluate the at least one of the error correction parameters and the filtered error correction parameters and generates the second interruption signal in dependence on the value of the at least one of the error correction parameters and the filtered error correction parameters during the first rotation of the moving device.

\* \* \* \* \*